(12) United States Patent
Maruo et al.

(10) Patent No.: US 7,619,024 B2
(45) Date of Patent: Nov. 17, 2009

(54) RESIN COMPOSITIONS, INTERCALATES, NANOCOMPOSITES AND LAMINATES PREPARED WITH AROMATIC POLYAMIDE AND POLYPHENOXY POLYMERS

(75) Inventors: Kazunobu Maruo, Kanagawa (JP); Tomomichi Kanda, Chiba (JP); Jun Mitadera, Kanagawa (JP); Ying Liang, Lake Zurich, IL (US); Tie Lan, Buffalo Grove, IL (US)

(73) Assignees: Amcol International Corporation, Hoffman Estates, IL (US); Mitsubishi Gas Chemical Company, Inc., Tokyo (JP)

( * ) Notice: Subject to any disclaimer, the term of this patent is extended or adjusted under 35 U.S.C. 154(b) by 393 days.

(21) Appl. No.: 11/216,692

(22) Filed: Aug. 31, 2005

(65) Prior Publication Data

US 2007/0049680 A1  Mar. 1, 2007

(51) Int. Cl.
*C08J 5/10* (2006.01)
*C08K 3/34* (2006.01)

(52) U.S. Cl. ................ 524/445; 524/186; 501/145; 501/147

(58) Field of Classification Search .......... 524/186, 524/445, 447
See application file for complete search history.

(56) References Cited

U.S. PATENT DOCUMENTS 6,156,835 A * 12/2000 Anderson et al. ........... 524/445
6,410,156 B1 * 6/2002 Akkapeddi et al. ....... 428/476.1
6,486,252 B1 * 11/2002 Barbee et al. ............... 524/445
6,486,253 B1 * 11/2002 Gilmer et al. ............... 524/445

OTHER PUBLICATIONS

Decker et al. "Synthesis of nanocomposite polymers by UV radiation curing" Polymer 46, (2005) 6640-6648.*

* cited by examiner

*Primary Examiner*—Katarzyna Wyrozebski
(74) *Attorney, Agent, or Firm*—Marshall, Gerstein & Borun LLP

(57) ABSTRACT

A resin composition comprising melt blending a polyamide resin such as nylon MXD6 with a polyphenoxy resin. The polyamide resin and the polyphenoxy resin may be combined prior to or after melting and can be sandwiched between two PET layers in a perform mold to form an article capable of blow molding to form a container with improved delamination resistance. Also, intercalated layered materials are prepared by co-intercalation of an onium ion, an aromatic polyamide oligomer or polymer, e.g., nylon MXD6, and a polyphenoxy oligomer or polymer between the planar layers of a swellable layered material, such as a phyllosilicate, preferably a smectite clay. The co-intercalated layered materials are combined with the aromatic polyamide and polyphenoxy resin to form a nanocomposite composition for sandwiching between PET layers to form containers having improved delamination resistance.

32 Claims, No Drawings

RESIN COMPOSITIONS, INTERCALATES, NANOCOMPOSITES AND LAMINATES PREPARED WITH AROMATIC POLYAMIDE AND POLYPHENOXY POLYMERS

FIELD

The present invention is directed to high barrier resin compositions for multilayer polyethylene terephthalate (PET) injection molding/blow molding applications. The barrier resin is based on aromatic polyamide Nylon MXD6. The addition of the polyphenoxy resin enhances the resin delamination resistance. Nanocomposite materials based on nylon MXD6, including a phenoxy resin, deliver enhanced barrier and delamination resistance. The nanocomposites are formed by intercalating layered materials, e.g., a phyllosilicate, such as a smectite clay, with an onium ion spacing/coupling agent and co-intercalation of the layered material with a melt of an aromatic polyamide and a polyphenoxy (as polymerizable reactants, or as the oligomers or polymers to form nanocomposite materials) with new and unexpected gas (particularly $O_2$) barrier properties, and new and unexpected resistance to delamination from to adjacent polymer layers, e.g., polyethylene terephthalate surrounding layers of a multi-layer bottle. The aromatic polyamide and the polyphenoxy resin can be intercalated in the form of its reactants (e.g., meta-xylylene diamine and adipic acid polymerizable monomers to form MXD6 nylon, in situ) or, can be unexpectedly easily intercalated as the oligomers or polymers by direct compounding, e.g., by combining the onium ion-intercalated layered material with the aromatic polyamide and the polyphenoxy in a mixing or extruding device to produce the co-intercalated layered material and the nanocomposite.

The interlaminar spacing of adjacent layers (platelets) of the layered material is expanded by at least about 3 Å, preferably by at least about 5 Å, contacting the layered material with the onium ion spacing/coupling agent for subsequent intercalation with the aromatic polyamide and the polyphenoxy. The onium ion may be primary, secondary, tertiary or quaternary and preferably is a long chain ($C_6^+$) onium ion spacing/coupling agent having at least one binding (ion-exchange) site capable of ion-exchanging or replacing $Li^+$, $Na^+$, $K^+$, $Ca^+$, $Mg^{+2}$, or other inorganic cations that occur within the interlayer spaces between adjacent layers or platelets of the layered materials. The association of the layered material inorganic cations with the onium ion spacing/coupling agent via ion-exchange enables the conversion of the hydrophilic interior clay platelet surfaces to hydrophobic platelet surfaces. Therefore, polymerizable aromatic polyamide oligomer, or polymer and phenoxy oligomer or polymer, can be easily intercalated between adjacent platelets of the layered material, e.g., smectite clay platelets.

In accordance with the preferred embodiment of the present invention, the aromatic polyamide intercalant has a weight average molecular weight between about 100 and about 5 million, preferably about 1,000 to about 500,000, and is intercalated between adjacent platelets of the onium ion-treated layered material, together with a polyphenoxy oligomer or polymer, preferably simultaneously with dispersing the intercalate into an aromatic polyamide/polyphenoxy matrix polymer blend, i.e., by direct compounding of the onium ion-treated layered material with the aromatic polyamide oligomer or polymer and a polyphenoxy oligomer or polymer blended matrix polymer. The co-intercalation of the onium ions, aromatic polyamide and polyphenoxy oligomers or polymers, or their monomeric reactants, results in a completely homogeneous dispersion of intercalated layered material and/or exfoliated platelets surprisingly effective for adhering adjacent polymer layers, e.g. polyethylene terephthalate (PET) together, and having surprising gas ($O_2$ and $CO_2$) barrier properties.

Optionally, the nanocomposite material can be sheared to exfoliate up to 100% of the tactoids or platelet clusters into individual platelets, preferably such that more than 80%; or more than 90% by weight of the layered material can be completely exfoliated into single platelet layers. Quick, easy, and completely homogeneous dispersion of the onium ion/aromatic polyamide/polyphenoxy co-intercalated layered material in the matrix polymer is achieved and the resulting nanocomposite has unexpected O2-impermeability. For example, a film of the MXD6 nylon/polyphenoxy polymer with the layered material, particularly a smectite clay, such as sodium bentonite, can be formed by direct compounding to provide a sheet of the MXD6 nylon/polyphenoxy without any visible intercalate filler that has completely unexpected, extremely low gas permeability.

The intercalates of the present invention can be dispersed uniformly into aromatic polyamide and/or polyphenoxy matrix polymers to form polymer/clay intercalate nanocomposites by direct compounding of the onium ion-intercalated clay with sufficient aromatic polyamide and polyphenoxy for intercalation of the clay to form an aromatic polyamide and polyphenoxy intercalated clay, as a concentrate, that can later be mixed with aromatic polyamide and/or polyphenoxy matrix polymers to form a nanocomposite. Alternatively, the onium ion-intercalated clay can be intercalated with monomer reactants that are polymerizable to form an aromatic polyamide (e.g., meta-xylylene diamine and a dicarboxylic acid, e.g., adipic acid) to form an MXD6 nylon co-intercalate, or with polyphenoxy monomer reactants, e.g., 4,4'-(1,3-phenylene diisoproplidene) bisphenol and 4,4'-cyclohexylidene bisphenol with epoxy monomers to form various phenoxy polymers and/or copolymers.

In another embodiment, the aromatic polyamide-intercalated and polyphenoxy-intercalated clay (intercalates) can be dispersed in one or more matrix monomers followed by polymerization of the matrix monomer(s), e.g., meta-xylylene diamine and adipic acid, and the polyphenoxy or its reactants, with in situ polymerization of the monomer reactants to form the matrix polymer(s), in situ; between the platelets of the layered material, and to form the matrix polymer. In accordance with an important feature, if an intercalant aromatic polyamide and an intercalant polyphenoxy polymer are intercalated into the onium ion-intercalated clay galleries, the MXD6 nylon intercalate can be directly compounded with the pristine matrix polymer, preferably an MXD6 nylon matrix polymer, and/or a polyphenoxy polymer to form a nanocomposite easily, while achieving a nanocomposite material with superior gas ($O_2$) impermeability and long lasting adherence to adjacent polymers, particularly, PET. If the polymerizable intercalant monomers, or the polymerizable aromatic polyamide and polymerizable polyphenoxy oligomer intercalants are intercalated into the clay galleries, the intercalants can be polymerized together with a desired monomer, oligomer or polymer matrix material, preferably an aromatic polyamide and/or a polyphenoxy polymer, and the combination then can be compounded to form the nanocomposites. Nylon MXD6 or MXD6 nanocomposites have been used in PET multilayer containers for various beverage packages to prevent oxygen ingress and loss of $CO_2$. The typical multilayer PET containers are prepared through preformed injection molding and blow molding. There is no tie or adhesive resin used in such systems. It is common to find partially or fully delaminated packages due to impact at handling, including in the filling line, shock in transition and customer handling.

The interphase between the barrier resin and PET determines the package delamination resistance. The combination of an aromatic polyamide, such as MXD6 nylon and a polyphenoxy improve the adhesion between PET and barrier layers. Therefore, the aromatic polyamide and polyphenoxy together enhance the package delamination resistance.

BACKGROUND AND PRIOR ART

It is well known that phyllosilicates, such as smectite clays, e.g., sodium montmorillonite and calcium montmorillonite, can be treated with organic molecules, such as organic ammonium ions, to intercalate the organic molecules between adjacent, planar silicate layers, for bonding the organic molecules with a polymer, for intercalation of the polymer between the layers, thereby substantially increasing the interlayer (interlaminar) spacing between the adjacent silicate layers. The thus-treated, intercalated phyllosilicates, having interlayer spacings increased by at least 3 Å, preferably at least 5 Å, e.g., to an interlayer (interlaminar) spacing of at least about 10-25 Å and up to about 100 Angstroms, then can be exfoliated, e.g., the silicate layers are separated, e.g., mechanically, by high shear mixing. The individual silicate layers, when admixed with a matrix polymer, before, after or during the polymerization of the matrix polymer, e.g., a polyamide—see U.S. Pat. Nos. 4,739,007; 4,810,734; 5,385,776; 6,232,388; and published application 2005/0009976 A1—have been found to substantially improve one or more properties of the polymer, such as mechanical strength and/or high temperature characteristics.

Exemplary prior art composites, also called "nanocomposites", are disclosed in this assignees U.S. Pat. No. 6,232,388; and in published applications 2005/0009976 A1 ('976) and 2004/0224112 A1 ('112). The '976 published application describes a gas barrier polyamide composition that includes a combination of a crystallizable polyamide and an amorphous polyamide that resists delamination from surrounding PET layers of a bottle, has a reduced $T_g$ and reduced crystallinity, but sacrifices gas barrier properties. The '112 published application describes a modified PET resin in a multilayer container.

In accordance with one embodiment of the intercalates, articles and methods described herein, intercalates are prepared by contacting a phyllosilicate with a monomeric onium ion spacing/coupling agent compound. To achieve the fill advantage of the present invention, the onium ion should include at least one long chain radical ($C_6$+) that may be aliphatic, straight or branched chain, or aralkyl. Exemplary of such suitable $C_6$+ onium ion molecules include primary, secondary, tertiary or quaternary ammonium ions, sulfonium ions, phosphonium ions, oxonium ions, or any ion of an element in Groups V or VI of the periodic table of elements.

In accordance with an important feature of the intercalates, articles and methods described herein, best results are achieved by mixing the layered material with the onium ions, e.g., $C_6$+ onium ion spacing/coupling agent, in a concentration of at least about 2% by weight, preferably at least about 5% by weight onium ion compound, more preferably at least about 10% by weight onium ion compound, and most preferably about 30% to about 80% by weight, based on the weight of onium ion compound and carrier (e.g., water, with or without an organic solvent for the onium ion compound) to achieve better sorption of the onium ion spacing/coupling agent compound between the platelets of the layered material.

Regardless of the concentration of onium ion compound in the intercalating composition, the weight of the onium ion intercalated clay should be about 0.5% to about 10%, preferably about 1% to about 7% most preferably about 2% to about 5%, based on the total weight of matrix polymer plus onium ion-intercalated clay. The compositions can be initially formed as concentrates having up to about 90% intercalated clay that can be diluted with additional matrix polymer to form the final compositions.

In accordance with an important feature of the intercalates, articles and methods described herein, it has been found that an onium ion-intercalated phyllosilicate, such as a smectite clay, can be intercalated easily with aromatic polyamide and polyphenoxy intercalants to form an onium ion aromatic polyamide and/or polyphenoxy matrix polymers polyamide and polyphenoxy intercalant co-intercalate that has excellent intercalate dispersibility in a matrix polymer, particularly an aromatic polyamide, e.g., MXD6 nylon, and/or polyphenoxy matrix polymer and has unexpectedly low gas (particularly $O_2$) permeability in an aromatic polyamide and/or polyphenoxy matrix polymer. The preferred proportions of polyphenoxy and aromatic polyamide intercalants are about 1% to about 20% by weight, preferably about 5% to about 10% by weight polyphenoxy and about 80% to about 99% by weight, preferably about 90% to about 95% by weight aromatic polyamide. The intercalate also can be added to any other matrix polymer to enhance a number of properties of the matrix polymer, including tensile strength, heat distortion temperature, gas-impermeability, elongation, and particularly adhesion of the polymer to an adjacent polymer layer.

The onium ion/aromatic polyamide and/or polyphenoxy co-intercalates and/or exfoliates thereof can be admixed with a polymer or other organic monomer compound(s) or composition to increase the viscosity of the organic compound or provide a matrix polymer/intercalate and/or matrix polymer/exfoliate composition to enhance one or more properties of the matrix polymer, particularly an MXD6 nylon matrix polymer.

The onium ion/aromatic polyamide and/or polyphenoxy co-intercalates can be added, particularly by direct compounding (mixing the intercalate directly into a matrix polymer melt) of the intercalate with any matrix polymer, e.g., all market available resin systems, particularly epoxy resins such as: Bisphenol A-derived resins, Epoxy cresol Novolac resins, Epoxy phenol Novolac resins, Bisphenol F resins, polynuclear phenol-glycidyl ether-derived resins, cycloaliphatic epoxy resins, aromatic and heterocyclic glycidyl amine resins, tetraglycidylmethylene-dianiline-derived resins, nylons, such as nylon-6 and nylon 66, and particularly MXD6 nylon.

DEFINITIONS

Whenever used in this Specification, the terms set forth shall have the following meanings:

"Layered Material" shall mean an inorganic material, such as a smectite clay mineral, that is in the form of a plurality of adjacent, bound layers and has a thickness, for each layer, of about 3 Å to about 50 Å, preferably about 10 Å.

"Platelets" shall mean individual layers of the Layered Material.

"Intercalate" or "Intercalated" shall mean a Layered Material that includes an onium ion spacing/coupling agent disposed between adjacent platelets of the Layered Material to increase the interlayer spacing between the adjacent platelets by at least 3 Å, preferably at least 5 Å, to an interlayer spacing, for example, of at least about 8 Å, preferably at least about 10

Å, and after MXD6 nylon and polyphenoxy co-intercalation, the d-spacing is increased to at least about 15 Å, preferably to 20 Å to 30 Å, e.g., 25 Å.

"Intercalation" shall mean a process for forming an Intercalate.

"Onium Ion Spacing/Coupling Agent" or "Onium Ion Compound" shall mean an organic compound that includes a positively charged atom selected from the group consisting of a nitrogen atom, a phosphorous atom, a sulfur atom or an oxygen atom, preferably a quaternary ammonium compound, and when dissolved in water and/or an organic solvent, an anion dissociates from the onium ion spacing/coupling agent leaving an onium cation that can ion-exchange with a silicate platelet exchangeable cation, e.g., $Na^+$, $Ca^{+2}$, $Li^+$, $Mg^{+2}$, or $K^+$.

"Aromatic Polyamide" shall mean a polymer that includes an amide linkage between the same monomer units or between different monomer units, such that at least one monomer unit of the polyamide includes an aromatic species. Such nonlimiting examples include phenyl, thiophenyl, furyl, pyridinyl, and polycyclic aromatic species such as naphthyl and antracenyl. These species may all be optionally substituted with a variety of substituents, including alkyl, alkenyl, alkynyl, ether, ester, amide, amine, and carboxylic acid.

"Co-intercalation" shall mean a process for forming an intercalate by intercalation of an onium ion spacing/coupling agent and, at the same time or separately, intercalation of an aromatic polyamide polymer, or intercalation of polymerizable monomers capable of reacting and polymerizing to form an aromatic polyamide polymer, and intercalation of a polyphenoxy oligomer or polymer or intercalation of polymerizable monomers capable of reacting and polymerizing to form a polyphenoxy polymer.

"Concentrate" shall mean an intercalate or exfoliate, formed by intercalation of an aromatic polyamide and/or polyphenoxy into a layered silicate material, to form a concentrate comprising 10-90% intercalant aromatic polyamide and polyphenoxy polymers and 10-90% intercalated layered silicate material.

"Intercalating Carrier" shall mean a carrier comprising water and/or an organic solvent used with the onium ion spacing/coupling agent and/or with the aromatic polyamide and polyphenoxy intercalant monomers/oligomers or polymers to form an Intercalating Composition capable of achieving Intercalation of the onium ion spacing/coupling agent and, at the same time or separately, intercalation of the aromatic polyamide and polyphenoxy polymer or monomer reactants between platelets of the Layered Material.

"Intercalating Composition" or "Intercalant Composition" shall mean a composition comprising an onium ion spacing/ coupling agent and/or aromatic polyamide and polyphenoxy Intercalants, and a Layered Material, with or without an Intercalating Carrier.

"Exfoliate" or "Exfoliated" shall mean individual platelets of an Intercalated Layered Material or tactoids or clusters of individual platelets, e.g., 2-10 platelets, preferably 2-5 platelets, that are smaller in total thickness than the non-exfoliated Layered Material, dispersed as individual platelets or tactoids throughout a carrier material, such as water, a polymer, an alcohol or glycol, or any other organic solvent, or throughout a matrix polymer, such as MXD6 nylon.

"Exfoliation" shall mean a process for forming an Exfoliate from an Intercalate.

"Matrix Polymer" shall mean a thermoplastic or thermosetting polymer that the Intercalate or Exfoliate is dispersed within to improve the mechanical strength, thermal resistance, and/or particularly the gas ($O_2$) impermeability of the Matrix Polymer, particularly MXD6 nylon and/or a polyphenoxy polymer.

"Nanoclay" should mean purified montmorillonite and other smectite clays. In some cases, the clay will have chemical modification for compatibility with polymer matrix.

SUMMARY

In brief, described herein are intercalated layered materials prepared by co-intercalation of an onium ion, an aromatic polyamide oligomer or polymer and a polyphenoxy oligomer or polymer between the planar layers of a swellable layered material, such as a phyllosilicate, preferably a smectite clay. The spacing of adjacent layers of the layered materials is expanded by at least about 5 Å, preferably to at least about 8 Å, usually to about 8-15 Å, e.g., 10 Å with an onium ion spacing/coupling agent. The intercalation of the aromatic polyamide and polyphenoxy oligomers ore polymers then increases the d-spacing of adjacent layers to at least about 15 Å, preferably about 20 Å to about 30 Å, generally about 25 Å.

Any aromatic polyamide intercalant and any polyphenoxy intercalant are suitable for intercalating the clay in accordance with the intercalates, nanocomposites and methods described herein, with the exception of the polyphenoxys found not suitable in Akkapeddi et al., S.P.E. ANTC meeting proceedings, 2003, specifically a polyphenoxy compound of two unsubstituted bisphenol repeating units or a bisphenol-hydroxyaminoether repeating unit.

MXD6 nylon film that does not include the intercalates and/or exfoliates described herein has an oxygen permeability of about 0.09-0.10 cc·mm/m²·day·atm, at atmospheric pressure, over a test period of 100 hours at 65%—relative humidity and 23° C. By incorporating only 5% by weight of the intercalates and/or exfoliates (nanoclays) of the present invention, the oxygen permeability is substantially reduced to 0.05-0.06 cc·mm/m²·day·atm, and the adherence of the film to surrounding polymer layers is substantially increased. By doubling the amount of nanoclay included in the MXD6 nanocomposite to about 5% by weight nanoclay, the oxygen permeability of the nanocomposite is again substantially reduced to 0.03-0.04 cc·m²·day·atm and the adherence to surrounding polymer layers again is substantially increased.

Described herein is a method of preparing intercalated layered materials prepared by co-intercalation of onium ion spacing/coupling agents an aromatic polyamide oligomer or polymer and a polyphenoxy oligomer or polymer into the galleries of layered materials, such as a smectite clay, to form intercalates or intercalate concentrate compositions that provide new and unexpected gas, particularly oxygen, impermeability and new and unexpected adherence to one or more adjacent polymer layers, particularly PET, when incorporated into, as by direct compounding with, matrix polymers, particularly an aromatic polyamide polymer, such as an MXD6 nylon and/or a polyphenoxy polymer.

Also described herein are intercalates and exfoliates prepared from the intercalate or intercalate concentrate compositions. The exfoliate can be prepared by adding the concentrate to one or more polymerizable monomers/oligomers and then polymerizing the monomers/oligomers to form polymers, or adding the concentrate to one or more polymers, e.g., MXD6 nylon, and/or a polyphenoxy polymer. The presence of one or more polymerizable monomers or oligomers in the galleries of the layered materials makes the layered materials compatible with the parent matrix polymer, e.g., MXD6 nylon, when the intercalate is added to additional matrix polymer that includes a polymer that is the same as at least one of the monomers, oligomers or polymers intercalated. Therefore, for example, when mixed with more MXD6 nylon, and a polyphenoxy polymer, the layered materials are unexpectedly ready to be dispersed or exfoliated in a matrix polymer that includes an MXD6 polymer and/or a polyphenoxy polymer. When a polymer curing agent is added, the layered materials may be exfoliated by virtue of the expanding, polymerizing intercalated monomers or oligomers and resulting polymer molecules dispersed between platelet layers, depending upon the degree of polymerization achieved. The exfoliated individual layers and tactoids of the layered materials will perform as a polymer reinforcement and molecule (gas) barrier in a matrix polymer to improve the mechanical properties and barrier properties, e.g., gas impermeability, of the matrix polymer, as well as adhesion to one or more adjacent polymer layers. The exfoliate also can be prepared by directly adding a curing agent to the monomer/-oligomer/or polymer/intercalated concentrate. The curing agent will penetrate into the gallery region of the intercalate to react with the polymerizable monomers, oligomers or polymers previously intercalated in the interlayer gallery and form uniformly dispersed platelets or a multi-layer intercalate in the resulting nanocomposite, having a high solids content.

In another embodiment, the intercalate can be added into a polar organic compound or a polar organic compound-containing composition carrier or solvent to provide unexpectedly viscous carrier compositions, for delivery of the carrier or solvent, or for administration of an active compound that is dissolved or dispersed in the carrier or solvent. Such intercalates and/or exfoliates also are especially useful in admixture with matrix thermoplastic or thermosetting polymers in the manufacture of polymeric articles, particularly when added to and mixed with an MXD6 nylon matrix polymer.

Addition of the onium ion/MXD6 nylon and polyphenoxy intercalate to a polymer melt enhances one or more properties; such as strength or temperature resistance, and particularly gas impermeability and adherence to one or more adjacent polymer layers. The intercalate is easily, homogeneously and uniformly dispersed throughout the carrier or solvent or matrix polymer to achieve new and unexpected viscosities in the carrier/platelet compositions even after addition of active organic compounds for administration of the active organic compound(s) from the composition; and provides unexpected gas barrier properties to matrix polymers, particularly MXD6 nylon and/or a polyphenoxy, as well as exceptional adherence to adjacent polymer layers, e.g., PET.

DETAILED DESCRIPTION OF THE PREFERRED EMBODIMENTS

To form the intercalated and exfoliated materials described herein, the layered material, e.g., the phyllosilicate, should be swelled or intercalated, in the preferred embodiment, by sorption of an onium ion spacing/coupling agent and, simultaneously or subsequently intercalated with an aromatic polyamide and a polyphenoxy.

While the compositions and methods described herein are described by way of the preferred embodiment via expanding the interlaminar spacing between adjacent platelets of a layered silicate material, e.g., a phyllosilicate, by first intercalating onium ions between the silicate platelets, prior to or simultaneously with intercalating aromatic polyamide and polyphenoxy intercalants, it should be understood that the aromatic polyamide and polyphenoxy intercalants can be intercalated between and complexed to the internal platelet faces by other well known mechanisms, such as the dipole/dipole (direct intercalation of the aromatic polyamide and polyphenoxy intercalants) method disclosed in this Assignee's U.S. Pat. Nos. 5,880,197 and 5,877,248, hereby incorporated by reference; and by intercalating a silane coupling agent, or by the acidification technique, by substitution with hydrogen (ion-exchanging the interlayer cations with hydrogen by use of an acid or ion-exchange resin) as disclosed in the Deguchi U.S. Pat. No. 5,102,948, and in the Lan, et al. U.S. Pat. No. 5,853,886, hereby incorporated by reference.

Sorption of the onium ion spacing/coupling agent should be sufficient to achieve expansion of the interlayer spacing of adjacent platelets of the layered material (when measured dry) by at least about 3 Å, preferably at least about 5 Å, and intercalation of the onium ion spacing/coupling agent and the aromatic polyamide and polyphenoxy intercalants should achieve a d-spacing of at least about 15 Å, preferably at least about 20 Å.

The onium ion spacing/coupling agent is introduced into the layered material galleries in the form of a solid or liquid composition (neat or aqueous, with or without an organic solvent, e.g., an aliphatic hydrocarbon, such as heptane to, if necessary, aid to dissolve the onium ion compound) having an onium ion spacing/coupling agent concentration sufficient to provide a concentration of about 5% to about 10% by weight clay (90-95% water) and the onium ion compound is dissolved in the clay slurry water, preferably at a molar ratio of onium ions to exchangeable interlayer cations of at least about 0.5:1, more preferably at least about 1:1. The onium ion-intercalated clay then is separated from the water easily, since the clay is now hydrophobic, and dried in an oven to less than 5% water, preferably bone dry, before being compounded with the aromatic polyamide and polyphenoxy intercalants for intercalation and compounding. The onium ion spacing/coupling agent compound can be added as a solid with the addition to the layered material onium ion compound blend of preferably at least about 20% water, more preferably at least about 30% water or more, based on the dry weight of layered material. Preferably about 30% to about 50% water, more preferably about 30% to about 40% water, based on the dry weight of the layered material, is included in the onium ion intercalating composition, so that less water is sorbed by the intercalate, thereby necessitating less drying energy after onium ion intercalation.

The onium ion spacing/coupling agent cations intercalated via ion-exchange into the interlayer spaces between adjacent layered material platelets are primary, secondary, tertiary or quaternary onium ions having the following preferred structure:

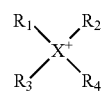

wherein X=N, P, S, or O; and wherein $R_1$, $R_2$, $R_3$ and $R_4$ are H or organic moieties, such as linear or branched alkyl, aryl or aralkyl moieties having 1 to about 24 carbon atoms.

The more preferred $C_6+$ onium ions are preferably quaternary ammonium ions having Formula 1, as follows:

Formula 1

Wherein $R_1$ is a long chain alkyl moiety ranging from $C_6$ to $C_{24}$, straight or branched chain, including mixtures of long chain moieties, i.e., $C_6$, $C_8$, $C_{10}$, $C_{12}$, $C_{14}$, $C_{16}$, $C_{18}$, $C_{20}$, $C_{22}$ and $C_{24}$, alone or in any combination; and $R_2$, $R_3$ and $R_4$ are moieties, same or different, selected from the group consisting of H, alkyl, benzyl, substituted benzyl, e.g., straight or branched chain alkyl-substituted and halogen-substituted; ethoxylated or propoxylated alkyl; ethoxylated or propoxylated benzyl, e.g., 1-10 moles of ethoxylation or 1-10 moles of propoxylation.

Additional useful multi-charged spacing/coupling agents include for example, tetra-, tri-, and di-onium species such as tetra-ammonium, tri-ammonium, and di-ammonium (primary, secondary, tertiary, and quaternary), -phosphonium, -oxonium, or -sulfonium derivatives of aliphatic, aromatic or arylaliphatic amines, phosphines, esters, alcohols and sulfides. Illustrative of such materials are di-onium compounds of the formula:

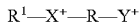

where $X^+$ and $Y^+$, same or different, are ammonium, sulfonium, phosphonium, or oxonium radicals.

Other useful spacing/coupling agent compounds are multi-onium ion compounds that include at least two primary, secondary, tertiary or quaternary ammonium, phosphonium, sulfonium, and/or oxonium ions having Formula 2, as follows:

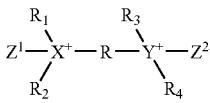

Formula 2 wherein R is an alkylene, aralkylene or substituted alkylene charged atom spacing moiety, preferably ranging from $C_3$ to $C_{24}$, more preferably about $C_3$ to $C_6$ for relatively high charge density (150 milliequivalents/100 grams C.E.C. to 70 milliequivalents/100 grams C.E.C.) layered materials; and preferably from $C_6$ to $C_{12}$ for medium to low charge density (70 milliequivalents/100 grams C.E.C. to 30 milliequivalents/ 100 grams C.E.C.) layered materials. R can be straight or branched chain, including mixtures of such moieties, i.e., $C_4$, $C_5$, $C_6$, $C_7$, $C_8$, $C_9$, $C_{10}$, $C_{11}$, $C_{12}$, $C_{13}$, $C_{14}$, $C_{15}$, $C_{16}$, $C_{17}$, $C_{18}$, $C_{19}$, $C_{20}$, $C_{21}$, $C_{22}$, $C_{23}$ and $C_{24}$, alone or in any combination; and $R_1$, $R_2$, $R_3$ and $R_4$ are moieties, same or different, selected from the group consisting of hydrogen, alkyl, aralkyl, benzyl, substituted benzyl, e.g., straight or branched chain alkyl-substituted and halogen-substituted; ethoxylated or propoxylated alkyl; ethoxylated or propoxylated benzyl, e.g., 1-10 moles of ethoxylation or 1-10 moles of propoxylation. $Z^1$ and $Z^2$, same or different, may be non-existent, or may be any of the moieties described for $R_1$, $R_2$, $R_3$ or $R_4$. Also, one or both of $Z^1$ and $Z^2$ may include one or more positively charged atoms or onium ion molecules.

Any swellable layered material that sufficiently sorbs the onium ion spacing/coupling agent to increase the interlayer spacing between adjacent phyllosilicate platelets by at least about 3 Å, preferably at least about 5 Å, can be used in the practice of this invention. Useful swellable layered materials include phyllosilicates, such as smectite clay minerals, e.g., montmorillonite, particularly sodium montmorillonite; magnesium montmorillonite and/or calcium montmorillonite; nontronite; beidellite; volkonskoite; hectorite; saponite; sauconite; sobockite; stevensite; svinfordite; vermiculite; and the like. Other useful layered materials include micaceous minerals, such as illite and mixed layered illite/smectite minerals, such as rectorite, tarosovite, ledikite and admixtures of illites with the clay minerals named above.

Preferred swellable layered materials are phyllosilicates of the 2:1 type having a negative charge on the layers ranging from about 0.15 to about 0.9 charges per formula unit and a commensurate number of exchangeable metal cations in the interlayer spaces. Most preferred layered materials are smectite clay minerals such as montmorillonite, nontronite, beidellite, volkonskoite, hectorite, saponite, sauconite, sobockite, stevensite, and svinfordite.

As used herein the "interlayer spacing" refers to the distance between the internal faces of the adjacent layers as they are assembled in the layered material before any delamination (exfoliation) takes place. The preferred clay materials generally include interlayer cations such as $Na^+$, $Ca^{+2}$, $K^+$, $Mg^{+2}$, $NH_4+$ and the like, including mixtures thereof.

The onium ions, aromatic polyamide and polyphenoxy intercalants may be introduced into (sorbed within) the interlayer spaces of the layered material in a number of ways. In a preferred method of intercalating the onium ions between adjacent platelets of the layered material, the layered material is slurried in water, e.g., at 5-20% by weight layered material and 80-95% by weight water, and the onium ion compound is dissolved in the water in which the layered material is slurried. If necessary, the onium ion compound can be dissolved first in an organic solvent, e.g., propanol. The layered material then is separated from the slurry water and dried prior to compounding with an aromatic polyamide oligomer or polymer and a polyphenoxy oligomer or polymer for intercalation of the aromatic polyamide oligomer or polymer and a polyphenoxy oligomer or polymer and to form the nanocomposite material in a matrix polymer, preferably MXD6 nylon and/or a polyphenoxy. In a preferred method of intercalating the aromatic polyamide oligomer or polymer and a polyphenoxy oligomer or polymer, the onium ion-treated layered material is intimately mixed with the aromatic polyamide and polyphenoxy, e.g., by extrusion or pug milling, to form an intercalating composition comprising the onium ion-intercalated layered material and an aromatic polyamide oligomer or polymer and a polyphenoxy oligomer or polymer.

The preferred diamine component as a starting material for the polyamide resin comprises 70 mol % or more of m-xylylenediamine. The diamine component may contain 30 mol % or less of at least one diamine other than m-xylylenediamine, such as aliphatic diamines including tetramethylenediamine; pentamethylenediamine; 2-methylpentanediamine; hexamethylenediamine; heptamethylenediamine; octamethylenediamine; nonamethylenediamine; decamethylenediamine; dodecamethylenediamine; 2,2,4-trimethylhexamethylenediamine; and 2,4,4-trimethylhexamethylenediamine; alicyclic diamines including 1,3-bis(aminomethyl)cyclohexane; 1,4-bis(aminomethyl)cyclohexane; 1,3-diaminocyclohexane; 1,4-diaminocyclohexane; bis(4-aminocyclohexyl) methane; 2,2-bis(4-aminocyclohexyl)propane; bis(aminomethyl)decalin; and bis(aminomethyl) tricyclodecane; and aromatic diamines including bis(4-aminophenol)ether; p-phenylenediamine; p-xylylenediamine; and bis(aminomethyl)naphthalene. Any one, two, or more of the diamines can be used for reaction with any one, two or more of the diacids to form suitable polymers.

The preferred carboxylic acid component as a starting material for reaction with the diamine comprises 70 mol % or more of a $C_4$-$C_{20}$ alpha, omega-straight-chain aliphatic dicarboxylic acid such as succinic acid; glutaric acid; pimelic acid; suberic acid; azelaic acid; adipic acid; sebacic acid; undecanedioic acid; dodecanedioic acid, and combinations of any two or more diacids. The dicarboxylic acid component may contain 30 mol % or less of a dicarboxylic acid other than the alpha-omega-straight-chain aliphatic dicarboxylic acid, such as an aromatic dicarboxylic acids including terephthalic acid; isophthalic acid; 2,6-naphthalenedicarboxylic acid, and combinations of two or more aromatic dicarboxylic acids. All dicarboxylic acids are useful in forming the polyamide polymers.

The preferred weight average molecular weight of the MXD6 intercalant is in the range of about 14,000 to about 40,000.

To achieve sufficient intercalation of the onium ions between adjacent platelets of the layered material, the layered material onium ion intercalating composition preferably contains a molar ratio of onium ions to layered material of at least 0.5:1 for the onium ions to exchange cations with the layered material, more preferably at least 1:1, most preferably 1:1, based on the dry weight of the layered material, so that the resulting onium ion-intercalated layered material has interior platelet surfaces that are sufficiently hydrophobic and sufficiently spaced for intercalation of an aromatic polyamide and polyphenoxy oligomer or polymer. The onium ion carrier (preferably water, with or without an organic solvent) can be added by first solubilizing or dispersing the onium ion compound in the carrier; or a dry onium ion compound and relatively dry phyllosilicate (preferably containing at least about 4% by weight water) can be blended and the intercalating carrier added to the blend, or to the phyllosilicate prior to adding the dry onium ion. When intercalating the phyllosilicate with onium ions in slurry form, the amount of water can vary substantially, e.g., from about 4% by weight, preferably from a minimum of at least about 30% by weight water, with no upper limit to the amount of water in the intercalating composition (the phyllosilicate intercalate is easily separated from the intercalating composition due to its hydrophobicity after onium ion treatment).

Alternatively, the onium ion intercalating carrier, e.g., water, with or without an organic solvent, can be added directly to the phyllosilicate prior to adding the onium ion compound, either dry or in solution. Sorption of the onium ion compound molecules may be performed by exposing the layered material to a dry or liquid onium ion compound in the onium ion intercalating composition containing at least about 2% by weight, preferably at least about 5% by weight onium ion compound, more preferably at least about 10% onium ion compound, based on the dry weight of the layered material.

In accordance with an emulsion method of intercalating the onium ions, and polyphenoxy oligomer or polymer between the platelets of the layered material, the layered material, preferably containing at least about 4% by weight water, more preferably about 10% to about 15% by weight water, is blended with water and/or organic solvent solution of an onium ion spacing/coupling agent compound in a ratio sufficient to provide at least about 5% by weight, preferably at least about 10% by weight onium ion compound, based on the dry weight of the layered material. The onium ion compound can be intercalated into the layered material simultaneously with the intercalation of the polyphenoxy intercalant that is emulsified together with the onium ions. The dried onium ion-intercalated clay then is combined, e.g., extruded with the aromatic polyamide, or with a blend of the aromatic polyamide and a polyphenoxy oligomer or polymer for direct compounding, with intercalation, of the aromatic polyamide, e.g., MXD6 nylon, into the onium ion- and polyphenoxy-intercalated layered material.

The onium ion spacing/coupling agents have an affinity for the phyllosilicate so that they are sorbed between, and are ion-exchanged with the cations on the inner surfaces of the silicate platelets, in the interlayer spaces.

In accordance with a preferred embodiment, the onium ion-intercalated layered material can be intercalated with an aromatic polyamide and polyphenoxy oligomer or polymer and then dispersed into one or more melt-processible thermoplastic and/or thermosetting matrix oligomers or polymers, or mixtures thereof, by direct compounding. Matrix polymers for use in this embodiment of the process of this invention may vary widely, the only requirement is that they are melt processible. In the preferred embodiment, the aromatic polyamide polymer is a blend of MXD6 nylon, and a polyphenoxy oligomer polymer and the MXD6 includes at least ten (10), preferably at least thirty (30) recurring monomeric units. The upper limit to the number of recurring monomeric units is not critical, provided that the melt index of the matrix polymer under use conditions is such that the matrix polymer forms a flowable mixture. Most preferably, the matrix polymer is MXD6 nylon that is intercalated into the onium ion-intercalated and polyphenoxy-intercalated layered material simultaneously with dispersing the intercalated clay uniformly into the MXD6 nylon matrix polymer. The MXD6 nylon matrix polymer preferably includes from at least about 10 to about 100 recurring monomeric units. In the most preferred embodiments of this invention, the number of recurring units is such that the matrix polymer has a melt index of from about 0.01 to about 12 grams per 10 minutes at the processing temperature.

MXD6 nylon, from Mitsubishi Gas Chemical Company, Inc., Tokyo, Japan is a polymer having the following Formula 3:

Formula 3

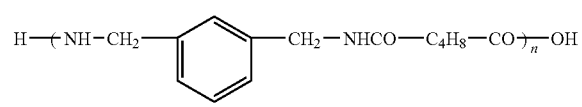

wherein n for the monomer=1;

n for the oligomer=2-10; and n for the polymer=11-1,000, preferably 11-500, more preferably 11-200.

The intercalant and/or matrix polyamide resins described herein may contain, if desired, one or more inorganic and/or organic compound additives such as lubricants, discoloration inhibitors, anti-crosslinking agents, light stabilizers, pigments, antistatic agents, flame retardants, mold releasing agents, phyllosilicates, organic or inorganic salts of Co, Mn or Zn, and complexes, solely and in combination of two or more.

Most preferred thermoplastic polymers for use as a matrix polymer are thermoplastic polymers such as polyamides, particularly nylons, most particularly MXD6 nylon, blended with about 1% to about 20% of a polyphenoxy having the structural Formula 4:

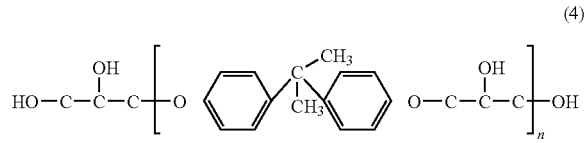

(4)

wherein n=10 to 100, preferably 20 to 50.

Nonlimiting examples of suitable polyphenoxys for use as a matrix polymer and/or intercalants include bisphenol-ester polymers, bisphenol-carbonate polymers, bisphenol-ether polymers, bisphenol-polyol polymers, bisphenol-acrylate polymers, bisphenol-methacrylate polymers, bisphenol-aliphatic or aromatic epoxy polymers, and bisphenol-alkenyl polymers. The bisphenol of the polyphenoxy can have a wide variety of structures. Nonlimiting examples of suitable bisphenols include isopropylidene bridged bisphenols, methylene bridged bisphenols, cyclohexylidene bridged bisphenols, ethylidene bridged bisphenols, and fluorenylidene bridged bisphenols. All or any of the bisphenols can be substituted with alkyl, alkenyl, alkynyl, halo, ether, ester, amido, cyano, hydroxyl, and aromatic groups.

Aromatic polyamides which may be used as matrix polymers and aromatic polyamide intercalates include: poly (arylene ether amides), heterocyclic amide polymers, poly(m-xylylene adipamide-isophthalamide), poly(2,4,6-triaminocaproic acid 1,3,5-triazine), polymerized aromatic dianhydrides with aromatic diamines, poly(N,N'-(1,3-phenylene)isophthalamide), polybenzimidazole, poly(trimellitic anhydride chloride-co-4,4' methylenedianiline), and poly(trimellitic anhydride chloride-alt-benzidine). Other polyamides can also be used, such as those disclosed in U.S. Pat. Nos. 3,380,969, 4,045,417, and 5,296,543, all of which are incorporated by reference herein.

Also, included are copolyamides and terpolyamides obtained by known methods, for example, by condensation of hexamethylene diamine or meta-xylylene diamine and a mixture of dibasic acids consisting of terephthalic acid and adipic acid. Polyamides of the above description are well-known in the art and include, for example, the copolyamide of 30% hexamethylene diammonium isophthalate and 70% hexamethylene diammonium adipate, poly(hexamethylene adipamide) (nylon 6,6), poly(hexamethylene sebacamide) (nylon 6,10), poly(hexamethylene isophthalamide), poly(hexamethylene terephthalamide), poly(heptamethylene pimelamide) (nylon 7,7), poly(octamethylene sebacamide) (nylon 8,8), poly(nonamethylene azelamide) (nylon 9,9), poly(decamethylene azelamide) (nylon 10,9), poly(decamethylene sebacamide) (nylon 10,10), poly[bis(4-amino cyclohexyl)methane-1,10-decane-carboxamide)], poly(m-xylylene adipamide), poly(p-xylylene sebacamide), poly(2,2,2-trimethyl hexamethylene terephthalamide), poly(piperazine sebacamide), poly(p-phenylene terephthalamide), poly(metaphenylene isophthalamide) and the like.

Other useful polyamides for use as a matrix polymer are those formed by polymerization of amino acids and derivatives thereof, as, for example, lactams. Illustrative of these useful polyamides are poly(4-aminobutyric acid) (nylon 4), poly(6-aminohexanoic acid) (nylon 6), poly(7-aminoheptanoic acid) (nylon 7), poly(8-aminooctanoic acid) (nylon 8), poly(9-aminononanoic acid) (nylon 9), poly(10-aminodecanoic acid) (nylon 10), poly(11-aminoundecanoic acid) (nylon 11), poly(12-aminododecanoic acid) (nylon 12) and the like.

In accordance with an important feature of the compositions and methods described herein, the intercalate and/or platelet/carrier compositions can be manufactured in a concentrated form, e.g., as a concentrate, e.g., having about 10-90%, preferably about 20-80% intercalate and/or exfoliated platelets of layered material and about 10-90%, preferably about 20-80% matrix polymer, particularly MXD6 nylon. The concentrate can be dispersed in the matrix polymer and optionally exfoliated, before or after addition to a polymer melt to a desired intercalate and/or platelet loading.

Mechanical shearing methods may be employed such as by extrusion, injection molding machines, Banbury® type mixers, Brabender® type mixers and the like. Shearing also can be achieved by introducing the layered material and intercalant monomer at one end of an extruder (single or double screw) and receiving the sheared material at the other end of the extruder. The temperature of the layered material/intercalant monomer composition, the length of the extruder, residence time of the composition in the extruder and the design of the extruder (single screw, twin screw, number of flights per unit length, channel depth, flight clearance, mixing zone, etc.) are several variables which control the amount of shear to be applied for exfoliation.

In accordance with an important feature of the present invention, it has been found that the onium ion-intercalated clay can be intercalated with the aromatic polyamide and polyphenoxy oligomer or polymer by direct compounding, i.e., by mixing the onium ion-intercalated layered material, e.g., smectite clay, directly with the aromatic polyamide and polyphenoxy oligomer or polymer in an extruder to make the onium ion/aromatic polyamide and polyphenoxy oligomer or polymer intercalated clay without significant exfoliation of the clay platelets. The intercalate-filled matrix polymer extrudes into a homogeneous transparent film with excellent dispersion of the intercalate, exceptional gas ($O_2$) impermeability and excellent adherence to one or more adjacent polymeric layers. The intercalate dispersed within the matrix polymer is a combination of exfoliated platelets and multilayer tactoids dispersed in the matrix polymer. The tactoids have the thickness of at least two individual platelet layers plus one to five monolayer thicknesses of intercalated polymers, and include small multiples or aggregates of platelets, in a coplanar aggregate, having the onium ions bonded or complexed or ion-exchanged to the platelet surface(s).

Molding compositions comprising a matrix polymer containing a desired loading of the onium ion/aromatic polyamide and polyphenoxy oligomer or polymer intercalates described herein, and/or individual platelets obtained from exfoliation of the intercalates manufactured as described herein, are outstandingly suitable for the production of sheets, films and panels having valuable properties. Such sheets, films and panels may be shaped by conventional processes such as vacuum processing or by hot pressing to form useful objects. The sheets and panels are also suitable as coating materials for other materials comprising, for example, wood, glass, ceramic, metal or other plastics, and outstanding strengths can be achieved without conventional adhesion promoters, because of the unexpected tenacity with which the film adheres to one or more adjacent polymeric layers, particularly PET. The sheets, films and panels can be laminated to other plastic films, sheets or panels and this is preferably effected by co-extrusion, the sheets being tenaciously bonded in the molten state. The surfaces of the sheets, films and panels, including those in the embossed form, can be improved or finished by conventional methods, for example by lacquering or by the application of protective films.

The intercalate composite materials described herein are especially useful for fabrication of multilayer co-injection bottles, extruded films and film laminates, as for example, films for use in food packaging that have extremely low $O_2$ permeabilities. Such bottles and films can be fabricated using conventional processing techniques. The barrier film in the multilayer structures are preferably from about 10 to about 100 microns, more preferably from about 20 to about 100 microns and most preferably from about 25 to about 75 microns in thickness.

The homogeneously distributed intercalate, and/or exfoliated platelets thereof, which has been onium ion and aromatic polyamide and polyphenoxy oligomer or polymer intercalated, as described herein, and an MXD6 nylon/polyphenoxy matrix polymer that form the preferred embodiment of the nanocomposite compositions described herein are formed into a film by suitable film-forming methods. Typically, the composition is melted and forced through a film forming die after aromatic polyamide and polyphenoxy oligomer or polymer intercalation and compounding. The film of the nanocomposite may go through sequential steps to cause the intercalate and/or exfoliated platelets thereof to be further oriented so the major planes through the intercalates and/or platelets thereof are substantially parallel to the major plane through the film. One method to accomplish this is to biaxially stretch the film. For example, the film is stretched in the axial or machine direction by tension rollers pulling the film as it is extruded from the die. The film is simultaneously stretched in the transverse direction by clamping the edges of the film and drawing them apart. Alternatively, the film is stretched in the transverse direction by using a tubular film die and blowing the film up as it passes from the tubular film die. The films may exhibit one or more of the following benefits in addition to decreased permeability to gases, particularly $O_2$ and increased adhesion to one or more adjacent polymer layers: increased modulus; increased wet strength; increased dimensional stability; and decreased moisture adsorption.

The following examples are presented to more particularly illustrate the invention and are not to be construed as limiting the scope of the invention.

EXAMPLES

Example 1

This example illustrates the formation of onium ion treated montmorillonite clay.

100 g of purified Na-montmorillonite (PGN, produced by Nanocor, Inc. Arlington Heights, Ill.) was dispersed in 3000 ml de-ionized water. This clay dispersion was heated to 80° C. 81.3 g of protonated Octadecyl Dihydroxyethyl methyl ammonium chloride (Tomah Products, Milton Wis.) was added into the clay slurry. The reaction mixture was kept at 80° C. for 60 min and then dewatered and washed through filtration. The final reaction product was dried at 110° C. to a moisture content less than 3%. A mechanical mill was used to reduce the particle size to pass through a 300 mesh screen. The basal spacing of the final product was 20 Å obtained from powder x-ray diffraction. The sample was marked as clay example 1 (CE1).

Example 2

This example illustrates the formation of the intercalates described herein with the protonated onium ion treated, purified montmorillonite clay (CE1), Phenoxy resin and nylon MXD6 through melt compounding.

100 g of CE1 was dry-mixed with 1800 g nylon MXD6 6007 (Mitsubishi Gas Chemical, Tokyo) and 100 g of a polyphenoxy polymer (PKHB, InChem, Rock Hill, S.C.). The mixture was extruded in a 27-mm twin screw extruder with a high shear screw configuration @ 500 rpm. The extruder barrel temperature setting was 250° C. across the board. The output rate is 10 kg/hr. This finished compound was labeled as nanocomposite example 1 (NE1).

Example 3

This example illustrates the formation of onium ion/Phenoxy intercalate with the use of an emulsion form of a Phenoxy resin.

This example illustrates the formation of onium ion treated montmorillonite clay.

100 g of purified Na-montmorillonite (PGN, produced by Nanocor, Inc. Arlington Heights, Ill.) was dispersed in 3000 ml de-ionized water. This clay dispersion was heated to 80° C. 81.3 g of Octadecyl Dihydroxyethyl methyl ammonium chloride (Tomah Products, Milton Wis.) was added into the clay slurry. The reaction mixture was kept at 80° C. for 60 min. 57 g of Phenoxy resin emulsion PKHW 34 (InChem, Rock Hill, S.C.) was added to the reaction mixture. The final mixture was kept at 80° C. for another 60 min and then dewatered and washed through filtration. Final reaction product is dried at 110° C. to a moisture content less than 12% by weight, preferably less than about 3%. Mechanical mill was used to reduce the particle size to pass 300 mesh screener. The basal spacing the final product is 34 Å obtained from powder x-ray diffraction. This sample is marked as CE2.

Example 4

This example illustrates the formation of onium ion/Phenoxy intercalate through a melt mixing procedure.

500-g of CE1 was dry-mixed with 500 g Phenoxy PKHB (InChem, Rock Hill, S.C.). The mixture was extruded in a twin screw extruder with high shear screw configuration @200 rpm. The extruder barrel temperature setting is 100° C. across the board. The output rate is 5 kg/hr. This intercalate sample was labeled as example CE3

Example 5

This example illustrates the formation of the invented intercalates with the onium ion treated montmorillonite clay (CE2), Phenoxy resin and nylon MXD6 through melt compounding.

120 g of CE2 was dry-mixed with 1780 g nylon MXD6 6007 (Mitsubishi Gas Chemical, Tokyo). The mixture was extruded in a 27-mm twin screw extruder with a high shear screw configuration @ 500 rpm. The extruder barrel temperature setting is 250° C. across the board. The output rate is 10 kg/hr. This finished compound is labeled as NCE2.

Example 6

This example illustrates the formation of the intercalates described herein with the onium ion/Phenoxy intercalate and compounding with nylon MXD6.

200 g of CE3 was dry-mixed with 1800 g nylon MXD6 6007 (Mitsubishi Gas Chemical, Tokyo). The mixture was extruded in a 27-mm twin screw extruder with a high shear screw configuration @ 500 rpm. The extruder barrel temperature setting is 250° C. across the board. The output rate is 10 kg/hr. This finished compound is labeled as NCE3.

Example 7

This example illustrates the formation the Phenoxy resin and nylon MXD6 polymer mixture described herein.

100 g of PKHB (InChem, Rock Hill, S.C.) was dry-mixed with 1900 g nylon MXD6 6007 (Mitsubishi Gas Chemical, Tokyo). The mixture was extruded in a 27-mm twin screw extruder with a high shear screw configuration @ 200 rpm. The extruder barrel temperature setting is 250° C. across the board. The output rate is 10 kg/hr. This sample was marked as E1.

Example 8

Example 8 demonstrates the formation of nylon MXD6 and polyphenoxy resin complex during a perform co-injection molding process. In this process, 1900 g of MXD6 6007 and 100 g of PKHB resin were dry blended and placed in a barrier resin hopper of a co-injection molder. The mixture was designated as E-MXD6-DB (dry blended). The PET barrier temperature is controlled at 275° C. and the barrier resin (MXD6 and PKHB) was controlled at 245° C. The barrier resin content is 8% of the total perform weight (30 g). Bottles were blown with a commercial blow molder. The preform pre-heat temperature was controlled in the range of 100-110° C. The bottle capacity is 500 ml.

Comparative Example 1

This comparative example illustrates the formation of intercalate onium ion treated clay with nylon MXD6 to form a MXD6 nylon nanocomposite.

100 g of CE1 was dry-mixed with 1900 g nylon MXD6 6007 (Mitsubishi Gas Chemical, Tokyo. The mixture was extruded in a 27-mm twin screw extruder with a high shear screw configuration @ 500 rpm. The extruder barrel temperature setting is 250° C. across the board. The output rate is 10 kg/hr. This finished compound is labeled as nanocomposite example 1 (CNE1).

Comparative Example 2

Fabrication of multilayer PET/Barrier/PET preforms and bottles containing the sample described in Comparative example 1 (CNE1)

Multilayer PET preforms were prepared with a commercial co-injection molder. The PET barrel temp is controlled at 275° C. and barrier resin at 245° C. The barrier resin has total 8% of the preform weight. The preform weight is 30 g. Bottles were blown with a commercial blow molder. The preform pre-heat temperature was controlled in the range of 100-110° C. The bottle capacity is 500 ml.

The following examples illustrate the properties of the multilayer PET bottles described for the multilayer PET/Barrier/PET bottles. The properties include oxygen barrier, and resistance to drop impact.

ASTM D2463 method was employed to evaluate the drop impact resistance of blow-molded PET multilayer containers. The average drop height of each sample is listed in Table 1.

Oxygen barrier properties were measured with a Mocon 2/61 unit. The testing condition is at 27° C. and relative humidity is 50% outside the bottles. The relative humidity inside the bottle is 0%. Testing was considered complete once the oxygen ingress rate reached a constant level.

Example 9

Example 9 demonstrates the formation of MXD6 nanocomposite and polyphenoxy resin complex during perform co-injection molding process. 1900 g of Nanocomposite CNE1 was dry blended with 100 g polyphenoxy (PKHB) and placed in the barrier resin hopper of the co-injection molder. This composition was designated as NCE4. The PET barrier temperature is controlled at 275° C. and barrier resin at 245° C. The barrier content is 8% of the total perform weight (30 g). Bottles were blown with a commercial blow molder. The preform pre-heat temperature was controlled in the range of 100-110° C. The bottle capacity is 500 ml.

Example 10

Fabrication of multilayer PET/Barrier/PET preforms and bottles containing the claimed intercalates NCE1, NCE2, NCE3 and E1.

Multilayer PET preforms were prepared with a commercial co-injection molder. The PET barrel temperature is controlled at 275° C. and barrier resin at 245° C. The barrier resin has a total of 8% of the preform weight. The preform weight is 30 g. Bottles were blown with a commercial blow molder. The preform pre-heat temperature was controlled in the range of 100-110° C. The bottle capacity is 500 ml.

Example 11

These examples illustrate the properties of the multilayer PET bottles described in the previous examples and comparative examples. The measured properties include oxygen barrier and resistance to drop impact.

ASTM D2463 method was employed to evaluate the drop impact resistance of blow-molded PET multilayer containers. The average heights of each sample were listed in Table 1.

Oxygen barrier properties were measured with a Mocon 2/61 unit. The testing condition is at 23° C. and relative humidity is 50% outside the bottles. The relative humidity inside the bottle is 0%. Testing was considered complete once the oxygen ingress rate reached a constant level.

| Example | Sample Code | Treated-clay, % | Phenoxy % | Oxygen Barrier (micro-L/day) | Drop height (cm) |
|---|---|---|---|---|---|
| 2/9 | NCE1 | 5 | 5 | 6 | 300 |
| 5/9 | NCE2 | 5 | 5 | 6 | 300 |
| 6/9 | NCE3 | 5 | 5 | 6 | 300 |
| 9 | NCE4 | 5 | 5 | 6 | 300 |
| 7 | E-MXD6-MB | 0 | 5 | 20 | 310 |
| 8 | E-MXD6-DB | 0 | 5 | 20 | 315 |
| Comp. 1/10 | CNE1 (nanocomposite) | 5 | 0 | 6 | 140 |
| Comp. 1/10 | MXD6 | 0 | 0 | 20 | 270 |

The invention claimed is:

1. A method of increasing the gas barrier and adhesion to a polymer layer of a matrix polymer comprising dispersing throughout said matrix polymer, in an amount of about 0.05% by weight to about 30% by weight, based on the total weight of the matrix polymer and an intercalate, the intercalate formed by intercalating an onium ion between layers of a phyllosilicate, and co-intercalating the phyllosilicate with an aromatic polyamide intercalant and about 1% to about 10% of a polyphenoxy intercalant, wherein the matrix polymer comprises the intercalated aromatic polyamide intercalant and the polyphenoxy intercalant.

2. A method in accordance with claim 1, wherein the polyphenoxy intercalant has the formula

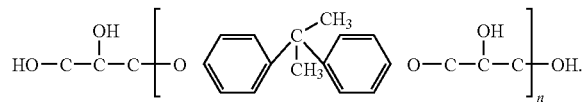

3. The method in accordance with claim 2, wherein n=20 to 50.

4. A method in accordance with claim 2, wherein the polyphenoxy intercalant is selected from the group consisting of bisphenol-ester polymer, bisphenol-carbonate polymer, bisphenol-ether polymer, bisphenol-polyol polymer, bisphenol-acrylate polymer, bisphenol-methacrylate polymer, bisphenol-aliphatic or aromatic epoxy polymer, and bisphenol-alkenyl polymer, and combinations thereof.

5. A method in accordance with claim 4, wherein the bisphenol portion of the polyphenoxy polymer is selected from the group consisting of an isopropylidene bridged bisphenol, methylene bridged bisphenol, cyclohexylidene bridged bisphenol, ethylidene bridged bisphenol, and fluorenylidene bridged bisphenol, and a combination thereof.

6. A method in accordance with claim 5, wherein one or more bisphenol of the polyphenoxy polymer molecules is substituted with a moiety selected from the group consisting of alkenyl, alkynyl, halo, ether, ester, amido, cyano, hydroxyl, aromatic and a combination thereof.

7. A method in accordance with claim 2, wherein the aromatic polyamide intercalant is selected from the group consisting of a poly(arylene ether amide), heterocyclic amide polymer; poly(m-xylylene adipamide-isophthalamide); poly(2,4,6-triaminocaproic acid 1,3,5-triazine); a polymerized aromatic dianhydride with an aromatic diamines; poly(N,N'-(1,3-phenylene)isophthalamide); polybenzimidazole; poly(trimellitic anhydride chloride-co-4,4' methylenedianiline); poly(trimellitic anhydride chloride-alt-benzidine); and combinations thereof.

8. A method in accordance with claim 2, wherein the aromatic polyamide intercalant is selected from the group consisting of a poly(arylene ether amide), heterocyclic amide polymer; poly(m-xylylene adipamide-isophthalamide); poly(2,4,6-triaminocaproic acid 1,3,5-triazine); a polymerized aromatic dianhydride with an aromatic diamines; poly(N,N'-(1,3-phenylene)isophthalamide); polybenzimidazole; poly(trimellitic anhydride chloride-co-4,4' methylenedianiline); poly(trimellitic anhydride chloride-alt-benzidine); and combinations thereof,
an aromatic polyamide obtained by condensation of hexamethylene diamine or meta-xylylene diamine and a mixture of terephthalic acid and adipic acid.

9. A method in accordance with claim 8, wherein the aromatic polyamide is selected from the group consisting of copolyamide of 30% hexamethylene diammonium isophthalate and 70% hexamethylene diammonium adipate, poly(hexamethylene adipamide); poly(hexamethylene sebacamide); poly(hexamethylene isophthalamide); poly(hexamethylene terephthalamide); poly(heptamethylene pimelamide); poly(octamethylene sebacamide); poly(nonamethylene azelamide); poly(decamethylene azelamide); poly(decamethylene sebacamide); poly[bis(4-amino cyclohexyl)methane-1,10-decane-carboxamide)]; poly(m-xylylene adipamide); poly(p-xylylene sebacamide); poly(2,2,2-trimethyl hexamethylene terephthalamide); poly(piperazine sebacamide); poly(p-phenylene terephthalamide); poly(metaphenylene isophthalamide) and combinations thereof.

10. A method in accordance with claim 2, wherein the aromatic polyamide intercalant is selected from the group consisting of a poly(arylene ether amide), heterocyclic amide polymer; poly(m-xylylene adipamide - isophthalamide); poly(2,4,6-triaminocaproic acid 1,3,5-triazine); a polymerized aromatic dianhydride with an aromatic diamines; poly(N,N'-(1,3-phenylene)isophthalamide); polybenzimidazole; poly(trimellitic anhydride chloride-co-4,4' methylenedianiline); poly(trimellitic anhydride chloride-alt-benzidine); poly(4-aminobutyric acid); poly(6-aminohexanoic acid); poly(7-aminoheptanoic acid); poly(8-aminooctanoic acid); poly(9-aminononanoic acid); poly(10-aminodecanoic acid); poly(11-aminoundecanoic acid); poly(12-aminododecanoic acid), and combinations thereof.

11. A method in accordance with claim 1, wherein the onium ions include at least one moiety covalently bonded to a positively charged nitrogen atom that has a length of at least six carbon atoms.

12. A method of manufacturing a composite material containing about 10% to about 99.95% by weight of a matrix polymer comprising an aromatic polyamide and a polyphenoxy, and about 0.05% to about 90% by weight of an onium ion-intercalated phyllosilicate material,
intercalating the phyllosilicate material with onium ions, and then mixing the matrix polymer, as a melt, throughout said phyllosilicate to achieve intercalation of a portion of the matrix polymer, as melted oligomers or melted polymers, between the phyllosilicate platelets.

13. A method of manufacturing a composite material containing about 40% to about 99.95% by weight of a matrix polymer comprising an aromatic polyamide, and about 0.05% to about 60% by weight of an intercalated phyllosilicate material, said intercalated phyllosilicate having an intercalant onium ion spacing agent intercalated between adjacent phyllosilicate platelets comprising:
contacting the phyllosilicate with an intercalating composition including an intercalant onium ion spacing agent in a molar ratio of onium ions:phyllosilicate interlayer cations of at least 0.25:1 to achieve intercalation of said intercalant onium ion spacing agent between said adjacent phyllosilicate platelets in an amount sufficient to space said adjacent phyllosilicate platelets at least an additional 3 Å;
combining the intercalated phyllosilicate with an aromatic polyamide and polyphenoxy matrix polymers, and heating the matrix polymers sufficiently to provide for flow of said matrix polymers into the phyllosilicate, and
dispersing said intercalated phyllosilicate throughout the heated matrix polymers.

14. A method in accordance with claim 13, wherein the combined intercalated phyllosilicate and heated matrix polymer comprising about 10% to about 200% by weight of said matrix polymer, based on the dry weight of phyllosilicate.

15. A method in accordance with claim 1, wherein the amount of onium ion spacing agent intercalated into the phyllosilicate material is in a molar ratio of at least 0.5:1, onium ions:exchangeable cations in the interlayer spaces of the phyllosilicate material.

16. A method in accordance with claim 15, wherein the amount of intercalant onium ion spacing agent intercalated into the phyllosilicate material is in a molar ratio of at least 1:1, onium ions:exchangeable cations in the interlayer spaces of the phyllosilicate material.

17. A method in accordance with claim 16, wherein the molar ratio of intercalated onium ion spacing agent to interlayer phyllosilicate cations is from about 1:1 to about 1:5.

18. A method of manufacturing a composite concentrate material containing about 40% to about 99.95% by weight of a matrix polymer, and about 0.05% to about 60% by weight of an onium ion, aromatic polyamide, and polyphenoxy co-intercalated phyllosilicate material comprising:
intercalating the phyllosilicate material with an onium ion spacing agent by contacting the phyllosilicate with onium ions in a molar ratio of onium ions:phyllosilicate interlayer exchangeable cations of at least 0.25:1;
combining the onium ion-intercalated phyllosilicate material with a melt of an aromatic polyamide and a melt of a polyphenoxy to form said onium ion intercalated, aromatic polyamide and polyphenoxy co-intercalated phyllosilicate material; and exfoliating at least a portion of the phyllosilicate into individual phyllosilicate platelets while in contact with the melt.

19. The method of claim 18 further including the step of adding more of the co-intercalants as matrix polymer, after exfoliation of the intercalate, to form a nanocomposite composition.

20. A nanocomposite concentrate composition comprising about 10 weight % to about 90 weight % of a layered silicate material intercalated with intercalant onium ions and with an aromatic polyamide and a polyphenoxy and about 10 weight % to about 90 weight % of a matrix polymer comprising the intercalated aromatic polyamide and about 1% to about 10% of the intercalated polyphenoxy, wherein the intercalated layered silicate material is dispersed uniformly throughout the matrix polymer.

21. A nanocomposite composition in accordance with claim 20, wherein the intercalated aromatic polyamide is MXD6 nylon.

22. A nanocomposite composition in accordance with claim 20, wherein the layered silicate material is intercalated with onium ions that include at least one moiety covalently bonded to a positively charged nitrogen atom that has a length of at least six carbon atoms.

23. A method of manufacturing a polyphenoxy-intercalated and aromatic polyamide-intercalated layered silicate comprising combining an onium ion spacing agent, water and a layered silicate to form a layered silicate slurry to intercalate the onium ion spacing agent into the layered silicate;
adding a water emulsion of a polyphenoxy polymer to the layered silicate slurry;
drying the layered silicate slurry to a moisture content less than about 12% by weight; and
dispersing the layered silicate throughout a melt of an aromatic polyamide and a polyphenoxy.

24. A method in accordance with claim 23, wherein the slurry is dried to a moisture content less than about 3% by weight.

25. A method of manufacturing a polyphenoxy and aromatic polyamide nanocomposite comprising adding the polyphenoxy-intercalated layered silicate manufactured in accordance with claim 24 to a melt of an aromatic polyamide matrix polymer.

26. A method in accordance with claim 23, wherein the aromatic polyamide is MXD6 nylon.

27. A film having oxygen barrier properties and adhesion to adjacent polymer layers comprising an aromatic polyamide matrix polymer containing about 0.05% to about 30% of a nanoclay formed by intercalating an onium ion between layers of a phyllosilicate, and co-intercalating the phyllosilicate with an aromatic polyamide intercalant and a polyphenoxy intercalant, wherein the matrix polymer comprises the intercalated aromatic polyamide intercalant and the polyphenoxy intercalant.

28. A multilayer film which comprises:
at least one aromatic polyamide composition layer containing a polyphenoxy-intercalated clay; and
at least one thermoplastic polymer layer on one or both sides of said at least one aromatic polyamide composition layer.

29. The multilayer film of claim 28, wherein said thermoplastic polymer comprises polyethylene terephthalate.

30. The multilayer film of claim 29, wherein said thermoplastic polymer comprises a polyolefin or polyester.

31. The multilayer film of claim 28, wherein the aromatic polyamide composition layer includes about 1% to about 20% of a polyphenoxy polymer.

32. The multilayer film of claim 31, wherein the aromatic polyamide composition layer includes about 5% to about 10% of a polyphenoxy polymer.

* * * * *